Patented Apr. 14, 1942

2,279,884

UNITED STATES PATENT OFFICE 2,279,884

INTERPOLYMERS OF DIBENZYL ITACONATE AND ETHYL METHACRYLATE

Gaetano F. D'Alelio, Pittsfield, Mass., assignor to General Electric Company, a corporation of New York No Drawing. Application September 12, 1939, Serial No. 294,496

2 Claims. (Cl. 260—78)

This invention relates to the production of new materials having valuable and characteristic properties that make them especially suitable for use in industry, for example in molding, laminating, casting, coating and adhesive applications, and for other purposes. The invention is concerned more particularly with compositions of matter comprising an interpolymer of a carbocyclic ester of itaconic acid, and at least one other polymerizable compound containing the structure

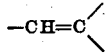

more particularly a

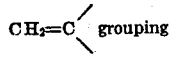 grouping (Carbocyclic itaconic esters are esters which are hydrolyzable to itaconic acid and a hydroxy carbocyclic compound, by which latter term is meant an organic hydroxy compound that contains a

 group either as part of, or attached to, a carbocyclic system.) Specifically the invention is concerned with a composition comprising the product of polymerization of a mixture containing dibenzyl itaconate and ethyl methacrylate in the ratio of 40 parts of the former to 60 parts of the latter.

The new esters prepared and used in practicing this invention may be defined as itaconic esters in which at least one ester group contains a carbocyclic structure. Examples of such esters are mono phenyl itaconate,

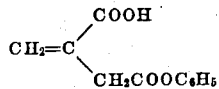

methyl phenyl itaconate,

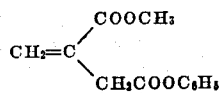

and ethyl cyclohexyl itaconate,

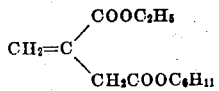

It will be noted that the two last-named esters are mixed esters in which at least one ester group contains a carbocyclic radical. The preparation of mixed esters is in general somewhat difficult and complicated, involving extensive processing and high cost. The mono esters are not difficult to make but no particular advantages ordinarily accrue from their use in the production of interpolymers. Hence the preferred embodiment of this invention comprises the preparation, and utilization in the production of interpolymers, of di-carbocyclic esters of itaconic acid in which both ester groups are identical. These esters also may be described as "symmetrical carbocyclic itaconic esters." Illustrative of such esters are di-(para chlorphenyl) itaconate, di-(naphthyl) itaconate, di-(phenoxyethyl) itaconate, di-(phenyl) itaconate, di-(cresyl) itaconate, di-(benzyl) itaconate, di-(cyclohexyl) itaconate, di-(phenylethyl) itaconate, di-(ortho methylcyclohexyl) itaconate, etc. The mixed and symmetrical itaconic diesters with which this invention is especially concerned may be graphically expressed by the formula

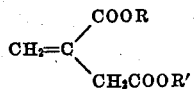

where R and R' are the same or different carbocyclic radicals, but preferably are the same.

In contrast to the previously known polymeric methyl, ethyl and optically active amyl esters of itaconic acid, the polymerized esters of this invention are of a somewhat rubbery nature and may be dissolved or swelled in benzene. These characteristics are quite surprising and unpredictable. Dimethyl, diethyl and optically active amyl itaconates have been described as hard, brittle masses or as readily friable products. The prior known itaconic esters belonged to the aliphatic series and possessed an open-chain structure. These new itaconic esters are of a carbocyclic nature and of the closed-carbon chain type. While extremely useful in themselves, they are especially adapted to the preparation of interpolymers as will be disclosed hereafter.

In carrying the present invention into effect, the above-described carbocyclic esters may be polymerized separately, or mixed with each other, or mixed with other polymerizable bodies. The homogeneous and heterogeneous polymers of this invention vary from viscous masses to rubbery and hard, solid bodies, depending upon the extent of polymerization and the particular polymerizable or other modifying agent, if any, which is incorporated therewith. Heat, light, or heat and light may be used to effect polymerization, although under such conditions the rate of polymerization is relatively slow. Hence, to accelerate the polymerization, I prefer to use a catalyst, accompanied by heat, light, or heat and light. Examples of catalysts which may be used are oxygen, ozone, hydrogen peroxide, sulfuric acid, aluminum chloride, boron fluoride, super-oxides such as aliphatic acyl peroxides, e. g., acetyl peroxide, stearyl peroxide, etc., peroxides of the aromatic acid series, e. g. benzoyl peroxide. Benzoyl peroxide is the preferred catalyst because of its ease of handling, its relative freedom from explosive hazards and its ready solubility in the monomeric or partially polymerized itaconic esters. The rate of polymerization is a function of the temperature and may be carried out at from room temperature (20–30° C.) to temperatures materially above 100° C., for example about 130° C.

The itaconic esters of this invention when polymerized alone form thermoplastic materials, that is, materials the shape of which can be easily changed by heat. The softening point, solubility and other properties of these itaconic esters depend upon the number of carbon atoms in, and the structure of, the ester grouping. In general, the greater the number of carbon atoms in the ester grouping, the lower is the softening point of the polymer. Some of the completely polymerized esters are clear, colorless, rubbery and somewhat ductile resinous bodies. Others are soft, free-flowing, viscous masses at temperatures of about 100° C., yet highly viscous or soft, slightly mobile masses at room temperature. Some possess properties intermediate elastic solids and dense, mobile, viscous masses.

In many applications the normally viscous, mobile polymers of high plastic flow are exceptionally valuable, particularly where non-volatilizing materials that can accommodate themselves to the form of the container are required. Particularly are they valuable when used alone, or when dissolved or dispersed in other dielectric materials including a liquid hydrocarbon such as mineral oil. This property of high plastic flow can be used to great commercial advantage in molding processes by interpolymerizing these monomers with other bodies of low plastic flow, thereby imparting the desired flow characteristics to the end-product.

In other cases, for example where it is desired to prepare products of higher softening point or of decreased brittleness and solubility, or to produce insoluble, infusible products, this may be done by copolymerizing a selected monomeric or partially polymerized ester of this invention with polymerizable unsaturated materials in monomeric or partially polymerized state, for example an ester of a polybasic acid in which at least two ester groups each contain an unsaturated hydrocarbon radical, more particularly a

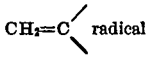 radical such as vinyl, allyl, methallyl, etc. Also, copolymers of valuable properties may be obtained by copolymerizing carbocyclic itaconic esters with other monomeric or partly polymerized itaconic esters, for example, dimethyl itaconate, diethyl itaconate, itaconic esters of unsaturated alcohols, for instance diallyl itaconate, etc., vinyl and allyl esters of saturated and unsaturated mono- and polycarboxylic acids, etc., more particularly, polymerizable materials containing a

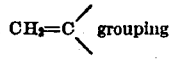 grouping for example monomeric or partly polymerized styrene, vinyl esters such as the acetate, chloride, bromide, fluoride, etc., vinyl ketones, methvinyl ketones, vinylidene halides as the chloride, bromide and fluoride, acrylic and methacrylic esters, e. g., methyl acrylate, ethyl acrylate, propyl acrylate, butyl acrylate, ethyl methacrylate, propyl methacrylate, butyl methacrylate, etc.

As illustrative of the differences in properties resulting from interpolymerizing the itaconic esters of this invention with other polymerizable materials, the following is mentioned:

Dibenzyl itaconate was treated at 85° C. with 1 percent by weight benzoyl peroxide for 64 hours, yielding a clear, rubbery mass. But, when 40 parts dibenzyl itaconate were copolymerized with 60 parts ethyl methacrylate, which alone forms a rubbery polymer, a surface-hard interpolymer was obtained.

Various methods may be used to prepare the esters with which this invention is concerned. For example, they may be prepared by ester exchange reactions in the presence of a suitable inhibiting agent, such as phenolic bodies, and a suitable catalyst, the reaction proceeding as in an alcoholysis. Thus, in the preparation of, for instance, di-(phenylethyl) itaconate, the reactants may comprise phenylethyl alcohol, dimethyl or diethyl itaconate, hydroquinone as an inhibiting agent and a catalyst such as metallic sodium, potassium carbonate, sulfuric acid, etc. The esters of this invention also may be prepared from itaconic nitrile by causing to react therewith an alcohol, corresponding to the ester desired, in the presence of water and an inorganic acid. Or, they may be made from itaconyl chloride and a selected alcohol, or by decomposition of a corresponding ester of citric or citraconic acids or one of their derivatives.

A preferred method of preparation is by direct esterification of itaconic acid with the selected alcohol in the presence of an esterification catalyst, with or without the presence of other unreactive bodies to remove the water resulting from esterification. This method may be carried out continuously.

The mixed esters of this invention, that is itaconic esters in which the ester groups are different, also may be prepared in various ways. Illustrative of such esters are methyl phenyl itaconate, butyl benzyl itaconate, benzyl phenethyl itaconate and amyl cyclohexyl itaconate. These mixed esters may be prepared, for instance, by effecting reaction between itaconic monoester acid chloride and a selected alcohol in the presence or absence of an inhibiting agent such as phenolic bodies, copper, etc. They also may be made by ester exchange reactions in the presence of a suitable catalyst, using an ester of a lower boiling alcohol, such as dimethyl or diethyl itaconate, and an alcohol corresponding to the ester desired.

Another method of preparation of these mixed esters is from itaconic monoacid chloride and a selected alcohol, followed by direct esterification of the other acid radical by another alcohol. These mixed esters also may be made by direct consecutive esterification of each of the carboxyl groups with different alcohols, or by treating itaconic diacid chloride first with one alcohol, then with another. They also may be prepared by saponification of one group of an itaconic diester with alcoholic potassium hydroxide in the cold and either isolating the monoacid from the potassium salt for further reaction with the selected alcohol or causing the potassium salt to react directly with an alkyl sulfate corresponding to the ester desired.

In order that those skilled in the art better may understand how the present invention may be carried into effect the following illustrative examples are given of the preparation of these new esters and of various compositions comprising the same. All parts are by weight.

EXAMPLE 1.—*Di-(phenyl) itaconate*

72 parts sodium hydroxide were dissolved in 500 parts water to which was added 169 parts pure phenol. To the phenate solution cooled to 15°–25° C. there was added slowly, with constant stirring and cooling, 115 parts itaconyl chloride. The ester formed as an oil which settled and was removed by mechanical separation. The ester was washed with water after dilution with an equal volume of benzene. The benzene solution was dried over anhydrous sodium carbonate and the solution filtered to remove solids and distilled. Di-(phenyl) itaconate, having a boiling point of approximately 170° C. at 1–2 mm. pressure and a melting point of 65°–68° C., was obtained. When this ester was treated with 1 per cent benzoyl peroxide for 64 hours at 85° C., a slightly rubbery, hard polymer was obtained.

EXAMPLE 2.—*Di-(benzyl) itaconate*

A solution of 70 parts benzyl alcohol, 32.5 parts itaconic acid, 0.65 part concentrated sulfuric acid and 70 cc. benzene was refluxed in a continuous esterification apparatus until no more water of reaction was collected. The resulting solution was washed with sodium carbonate solution and dried over anhydrous sodium carbonate. The benzene was distilled off under reduced pressure, after which the distillation was continued to obtain di-(benzyl) itaconate boiling at approximately 195° C. at 1 mm. pressure.

Itaconic acid was similarly reacted with phenylethyl alcohol, cyclohexyl alcohol and ortho methylcyclohexyl alcohol to give, respectively, di-(phenylethyl) itaconate boiling at 180°–190° C. at 1 mm. pressure, di-(cyclohexyl) itaconate boiling at 150°–155° C. at 1 mm. pressure, and di-(ortho methylcyclohexyl) itaconate boiling at 163°–167° C. at 1 mm. pressure.

These esters were treated with 1 per cent benzoyl peroxide at 85° C. for 64 hours to obtain polymeric bodies. Di-(benzyl) itaconate produced a clear, rubbery polymer; the phenylethyl ester, a colorless, rubbery polymer; the cyclohexyl ester, a tough, resilient polymer; and the ortho methylcyclohexyl ester, a viscous, very plastic mass.

The following examples are illustrative of the production of interpolymers of this invention. All parts are by weight. Polymerization was effected by heating the material with the amount of peroxide and at the temperature stated in the examples. It is to be understood that these ratios may be varied considerably and that temperatures other than those designated in the examples may be used.

EXAMPLE 3

(a) 50 parts di-(benzyl) itaconate and 50 parts vinyl acetate
(b) 50 parts di-(phenylethyl) itaconate and 50 parts vinyl acetate
(c) 50 parts di-(cyclohexyl) itaconate and 50 parts vinyl acetate The above two-component mixtures were treated with 0.5 per cent benzoyl peroxide for 64 hours at 55° C. to give, respectively, (a') A soft, clear copolymer with a bluish fluorescence;
(b') A soft, translucent copolymer; and
(c') A viscous, translucent copolymer.

The addition of as little as 0.1 part of a polyallyl ester of a polycarboxylic acid, specifically diallyl itaconate, to the mixed monomers of (a), (b) and (c) results in interpolymers of increased solvent-resistance, heat-resistance or heat- and solvent-resistance. By suitably increasing the percentage proportion of such diallyl esters, insoluble, infusible interpolymers can be produced.

EXAMPLE 4

(a) 50 parts di-(phenyl) itaconate and 50 parts ethyl methacrylate
(b) 50 parts di-(benzyl) itaconate and 50 parts ethyl methacrylate
(c) 50 parts di-(phenylethyl) itaconate and 50 parts ethyl methacrylate
(d) 50 parts di-(cyclohexyl) itaconate and 50 parts ethyl methacrylate The above two-component mixtures were treated with 0.5 per cent benzoyl peroxide for 64 hours at 55° C., yielding in all cases clear, hard, colorless copolymers. This is surprising in view of the different properties of the copolymers of a', b' and c' of Example 3. Further, it would be expected that an interpolymer of a carbocyclic itaconic ester with ethyl methacrylate, which alone forms a soft polymer, would result in a very soft, viscous copolymer. However, the copolymers are harder than the polymers obtained from either component alone. A wide range of properties may be obtained by varying the above-specified ratios.

EXAMPLE 5

The ethyl methacrylate of Example 4 was replaced by methyl methacrylate and colorless, hard, clear copolymers were obtained in all cases. These copolymers are particularly adapted to injection molding, as they need not be plasticized. A wide range of properties may be obtained by varying the above-specified ratios.

EXAMPLE 6

(a) 50 parts di-(benzyl) itaconate and 50 parts ethyl acrylate
(b) 50 parts di-(phenylethyl) itaconate and 50 parts ethyl acrylate
(c) 50 parts di-(cyclohexyl) itaconate and 50 parts ethyl acrylate The above two-component systems were treated with 0.25 per cent benzoyl peroxide at 55° C. for 64 hours to give, respectively, (a') A clear, rubbery copolymer with a bluish fluorescence;
(b') A clear, colorless, rubbery copolymer; and
(c') A clear, colorless, soft copolymer.

EXAMPLE 7

40 parts di-(benzyl) itaconate, 50 parts ethyl methacrylate, 0.1 part diallyl itaconate
40 parts di-(phenylethyl) itaconate, 50 parts ethyl methacrylate, 0.1 part diallyl itaconate
40 parts di-(cyclohexyl) itaconate, 50 parts ethyl methacrylate, 0.1 part diallyl itaconate
40 parts di-(phenyl) itaconate, 50 parts ethyl methacrylate, 0.1 part diallyl itaconate The above three-component systems were treated at 55° C. with 0.5 part benzoyl peroxide for 64 hours to give hard, clear, colorless copolymers of increased solvent resistance compared to the copolymers of Example 4.

EXAMPLE 8

40 parts di-(phenyl) itaconate, 50 parts ethyl acrylate, 0.3 part diallyl itaconate
40 parts di-(benzyl) itaconate, 50 parts ethyl acrylate, 0.3 part diallyl itaconate
40 parts di-(phenylethyl) itaconate, 50 parts ethyl acrylate, 0.3 part diallyl itaconate
40 parts di-(cyclohexyl) itaconate, 50 parts ethyl acrylate, 0.3 part diallyl itaconate Each of the above mixtures was treated similarly to the mixtures of Example 7, yielding clear, colorless, rubbery copolymers in all cases with the exception of the di-(benzyl) itaconate copolymer, which was slightly fluorescent.

The diallyl itaconate of Examples 7 and 8 may be increased or may be replaced in whole or in part by substances such, for instance, as allyl and methallyl esters of polybasic acids, for example diallyl carbonate, diallyl oxalate, diallyl malonate, diallyl succinate, diallyl glutarate, diallyl adipate, diallyl pimelate, diallyl suberate, diallyl azelate, diallyl sebacate, diallyl alpha, dimethyl malonate, diallyl alpha allyl malonate, diallyl maleate, diallyl fumarate, diallyl phthalate, diallyl tartrate, triallyl citrate, triallyl carballylate, diallyl citraconate, diallyl mesaconate, diallyl glutaconate, diallyl hydromucate, diallyl glutinate, tetra-allyl symmetrical ethane tetracarboxylate, etc.; polyhydric alcohol and unsaturated alcohol esters of acrylic and methacrylic acids, for example glycol acrylate, glycol dimethacrylate, allyl acrylate, allyl methacrylate, methallyl acrylate, methallyl methacrylate, etc.; or by mixtures of such substances.

The carbocyclic itaconic esters, as well as the interpolymers obtained by copolymerizing these esters with other polymerizable bodies, have a wide range of properties. Their hardness and solubilities may be varied over a considerable range from fluid compositions of varied intrinsic viscosity or soft, flexible bodies to hard, rigid masses that can be swelled or dissolved in many volatile and non-volatile solvents, even those of a hydrocarbon nature. By suitable selection of the starting monomeric or partly polymerized materials, interpolymers can be obtained in an insoluble, infusible state practically resistant to the destructive effect of other chemical bodies such as acids, bases, solvents and the like.

When a plasticizing effect is desired in some other synthetic or natural plastic or potentially plastic material, the itaconic esters of this invention are particularly suited for that purpose. High molecular weight bodies such as polyvinyl chloride, cellulose esters such as the acetate, propionate, butyrate, etc., cellulose ethers such as methyl cellulose, ethyl cellulose, benzyl cellulose, etc., polymerized methyl methacrylate, polystyrene, etc., may be plasticized by incorporating therewith a carbocyclic itaconic ester in monomeric, partially polymerized or completely polymerized state, in the presence or absence of a catalyst such as benzoyl peroxide when the monomeric or partially polymerized forms are used. The itaconic ester may be incorporated into the high molecular weight body to be plasticized by simple mechanical agitation or by the use of mutual solvents, followed by the standard mechanical processes known in the plastics art. These bodies then may be subjected to further heat and pressure treatment if desired.

Compositions comprising a polyvinyl halide, specifically polyvinyl chloride, and a carbocyclic ester of itaconic acid such as those disclosed in the paragraph next preceding are claimed in my copending application Serial No. 307,144, filed December 1, 1939, and assigned to the same assignee as the present invention.

The esters of this invention may be converted to polymers or interpolymers in molds with or without the application of pressure, in the presence or absence of a material which is a solvent for the monomer but not for the polymer, or one which is a solvent for both monomer and polymer, or one which is not a solvent for either the monomer or polymer so that spongy or granulated polymeric modifications are obtained.

The solid, thermoplastic polymers and copolymers of this invention, with or without modifying agents, may be used in injection, compression, or transfer molding processes to make numerous articles for industrial, technical and novelty use and other applications.

As modifying agents various fillers may be used, for example wood flour, alpha flock, sand, asbestos, mica, paper, cloth, cellulose derivatives such as cellulose itself, regenerated cellulose, cellulose esters, cellulose ethers, natural and synthetic filaments or fibers, etc., in continuous, shredded, or comminuted form. Pigments, dyes, opacifiers, plasticizing substances, such as dibutyl phthalate, esters of monobasic and polybasic acids, etc., may be incorporated into the polymers and copolymers of this invention to modify the same. Natural and synthetic resins, gums, oils, waxes, polyhalogenated aromatic derivatives, etc., likewise may be added as modifying agents.

In solvents, or without solvent utilizing a melt process, the fusible polymers may be used in adhesive and laminating applications, to bond paper, wood, mica flakes, glass sheets, rubber sheets, etc., fibrous materials such as silk, asbestos, glass fibers, synthetic fibers in filament, thread or fabric (woven or felted) form, etc., cellulose derivatives in sheet, comminuted or fiber form, etc. In the form of liquid coating compositions such as lacquers, enamels, varnishes, etc., they find application in surface protective coatings, such as for walls, desks, wire, concrete, porcelains, etc. In a flowable condition without the use of solvents they may be used as impregnants for many porous bodies, such as cork, pottery, felts, or fabricated bodies with interstices, such as the windings of electrical coils, netted fiber, interwoven fibrous materials, etc.

When the monomers of this invention are copolymerized with, for example, diallyl itaconate in the presence of another non-polymerizable body which acts as a solvent for these monomers, there results a homogeneous gelled material which firmly binds the solvent so as to reduce to a minimum evaporation losses of the solvent. Illustrative of non-polymerizable bodies which thus may be gelled are butyl alcohol, benzene, ethylene dichloride, the monohalogenated aromatic hydrocarbons or mixtures of halogenated aromatic hydrocarbons, ethylene glycol, mineral oils including lubricating oils, etc.

What I claim as new and desire to secure by Letters Patent of the United States is:

1. The method of producing a new synthetic composition which comprises forming a mixture containing monomeric dibenzyl itaconate and ethyl methacrylate in the ratio of 40 parts of the former to 60 parts of the latter and, in addition to said monomers, a small amount of polymerization catalyst, and heating the said mixture to produce a solid interpolymer.

2. A composition comprising the product of polymerization of a mixture containing dibenzyl itaconate and ethyl methacrylate in the ratio of 40 parts of the former to 60 parts of the latter.

GAETANO F. D'ALELIO.

Certificate of Correction

Patent No. 2,279,884.   April 14, 1942.

GAETANO F. D'ALELIO

It is hereby certified that errors appear in the printed specification of the above numbered patent requiring correction as follows: Page 1, first column, lines 23–24, for "$\diagdown\!\!\!\!\!\diagdown\text{C}-\text{OH group}$" read $-\text{C}-\text{OH group}$; page 3, second column, line 34, after "cyclohexyl" insert a parenthesis; page 4, first column, line 38, for "azelate" read *azelaate*; and second column, line 73, for "looses" read *losses*; and that the said Letters Patent should be read with these corrections therein that the same may conform to the record of the case in the Patent Office.

Signed and sealed this 2nd day of June, A. D. 1942.

[SEAL]

HENRY VAN ARSDALE,
*Acting Commissioner of Patents.*